May 8, 1928.
C. KUPFER
1,669,301
RIBBON SHIFTING MEANS FOR TYPEWRITERS
Filed April 4, 1927 4 Sheets-Sheet 1
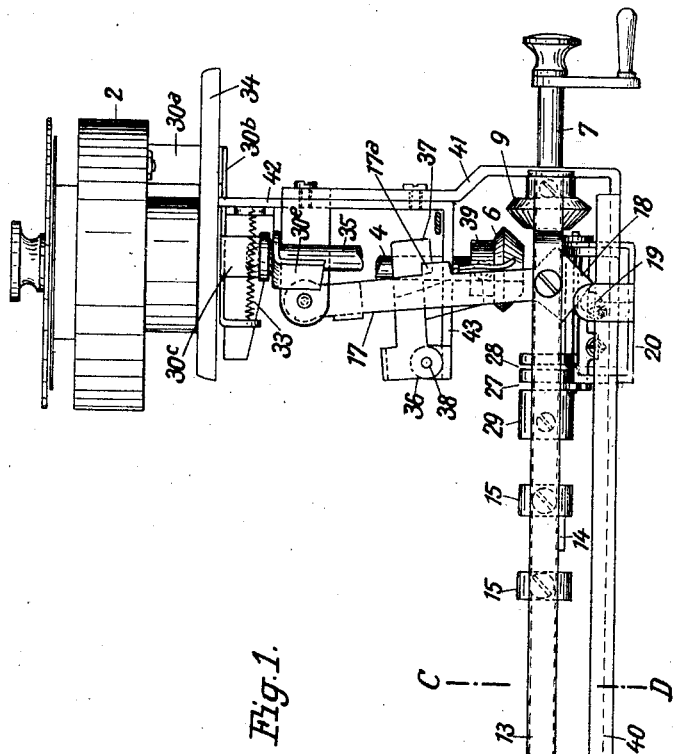
Fig.1.
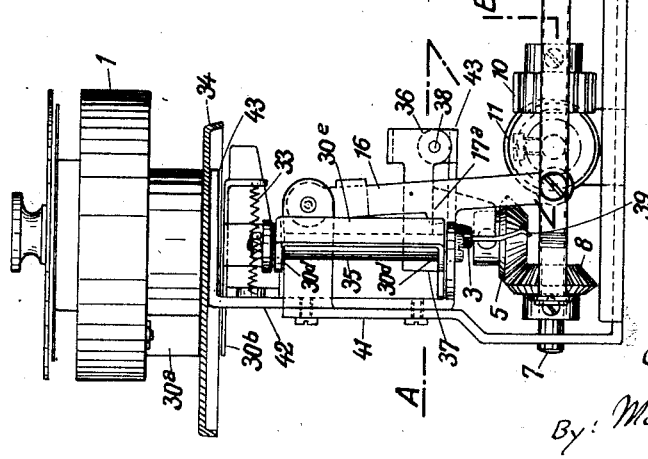
Inventor:
C. Kupfer
By: Marks & Clerk
Attys.

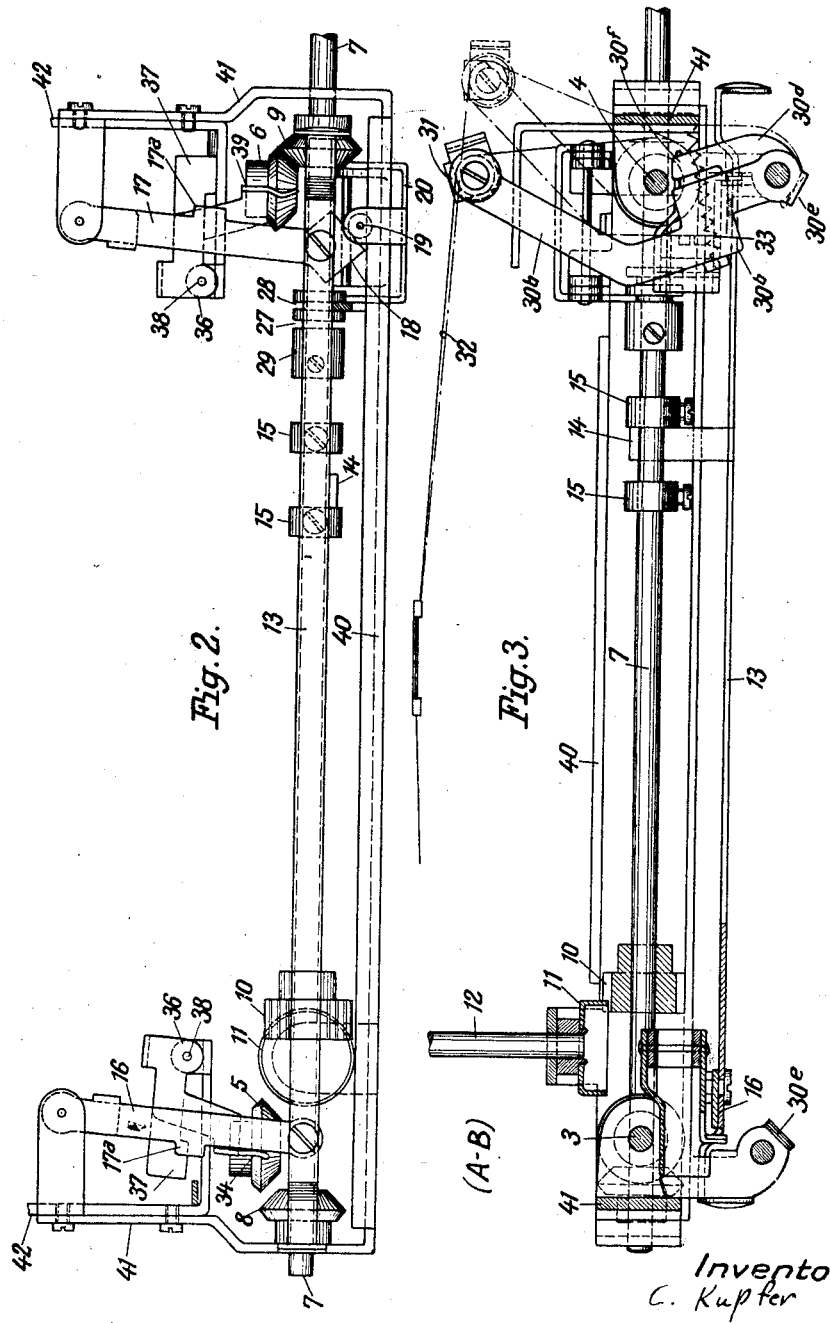

May 8, 1928. 1,669,301
C. KUPFER
RIBBON SHIFTING MEANS FOR TYPEWRITERS
Filed April 4, 1927 4 Sheets-Sheet 3
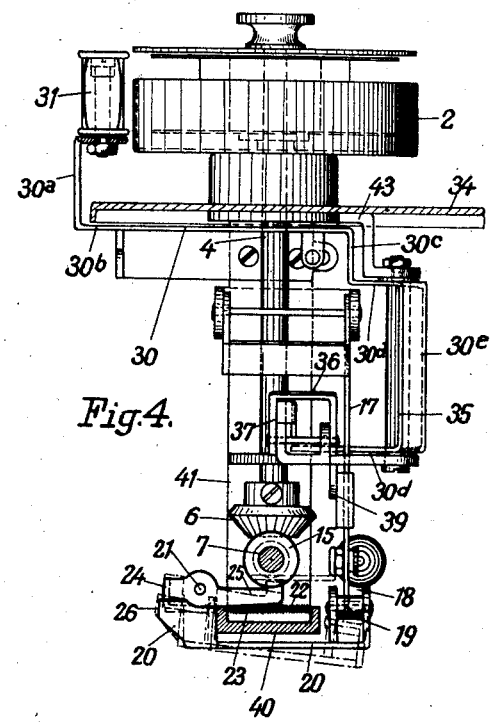
Fig. 4.
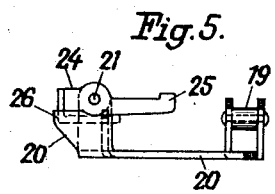
Fig. 5.
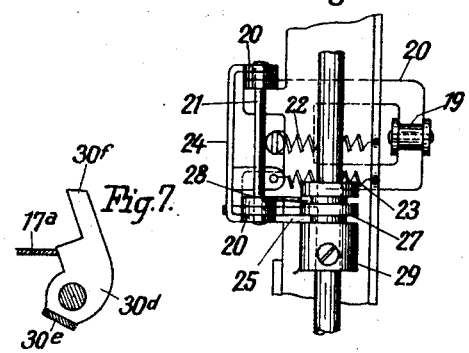
Fig. 6.
Fig. 7.
Inventor:
C. Kupfer
By: Marks & Clerk
Attys.

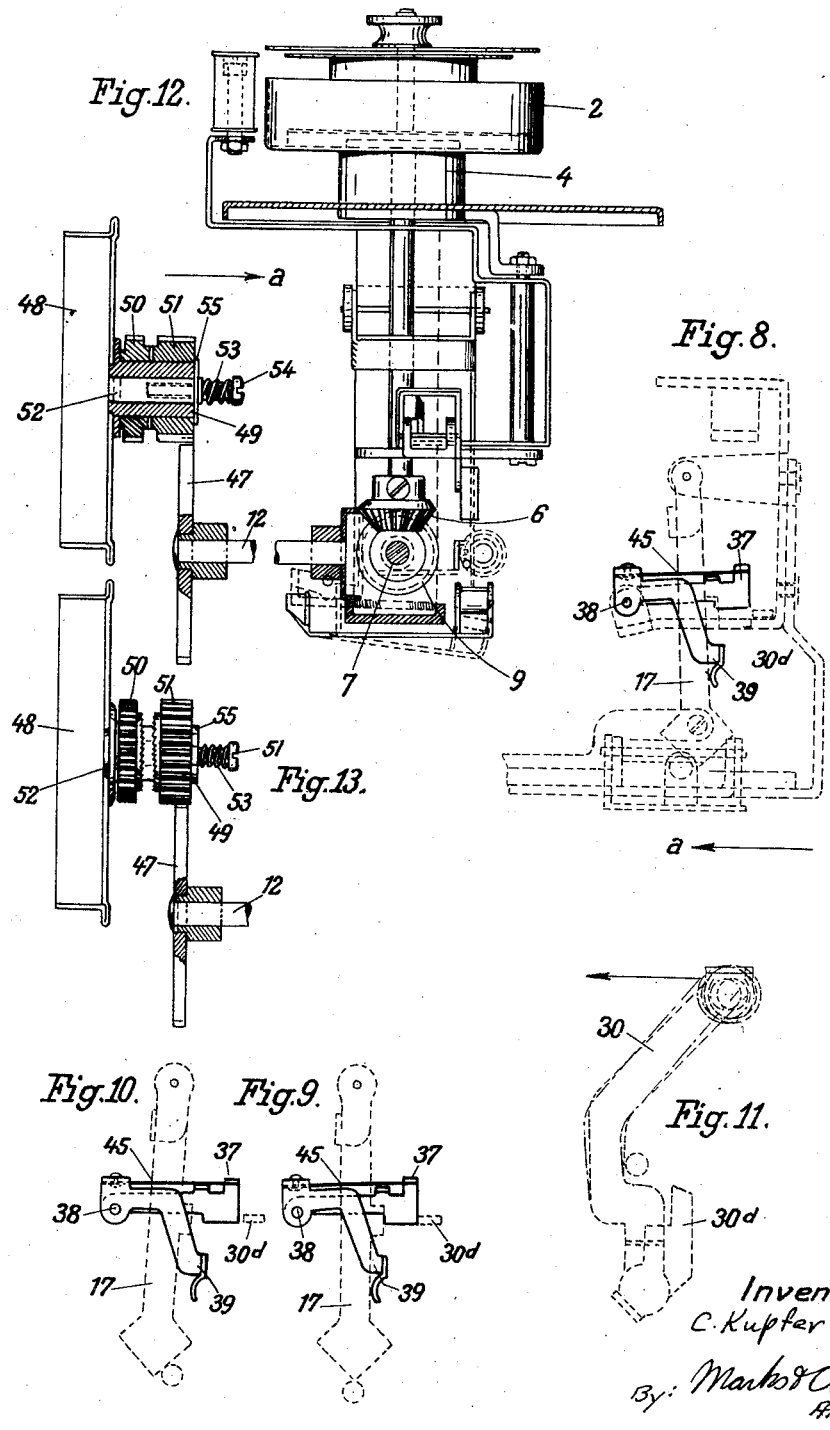

Patented May 8, 1928.

1,669,301

UNITED STATES PATENT OFFICE.

CARL KUPFER, OF NUREMBERG, GERMANY, ASSIGNOR TO TRIUMPH-WERKE NÜRNBERG A.-G., OF NUREMBERG, GERMANY.

RIBBON-SHIFTING MEANS FOR TYPEWRITERS.

Application filed April 4, 1927, Serial No. 180,972, and in Germany April 9, 1926.

This invention relates to an automatic ribbon shifting device for typewriters, which is distinguished from known shifting devices of this nature by the fact that the shift levers, which are subject to the influence of the ends of the ribbon on the one hand act upon the carrying arms of a horizontally slidable shift bar that effects the shifting of the ribbon drive and on the other hand are subject to the action of locking bows, which lock the shift lever that has just come into operation.

The invention furthermore comprises the special construction of the locking bow that locks the shifting levers, which comprises two limbs, one of which engages with the shift lever and the other with the carrying arm of the shift bar.

Finally the invention also relates to a special appliance in connection with these ribbon shifting devices, by which disturbances of the working of the shifting means are prevented.

In the accompanying drawings the invention is illustrated in two constructional examples. One constructional example of the new ribbon shifting device is shown:—

In Figures 1 and 2 in front elevation, with their members in different positions.

In Figure 3 in section on the line A—B in Figure 1;

In Figure 4 in section on the line C—D in Figure 1;

Figure 5 is a view of a shift lever for securing the carrying arm which actuates the shift bar;

Figure 6 is a plan view of the device shown in Figure 5 and of part of the mechanism associated with it; and Figure 7 shows the shift lever for actuating the carrying arm which actuates the shift bar.

Figures 8, 9 and 10 show a second, improved constructional form of the two-limbed locking bow for the right hand shift lever in various positions; and Figure 11 is a plan of the shift lever;

Figure 12 illustrates the clutch device interposed between the carriage pull and the ribbon shifting means for the case of ordinary driving and Figure 13 the clutch released in the event of disturbance.

The ribbon spools 1 and 2 are mounted upon shafts 3 and 4 respectively, which carry bevel wheels, 5 and 6 respectively, at their lower ends. Underneath these bevel wheels 5 and 6 a horizontal shaft 7 with two bevel wheels 8 and 9 is so supported as to be longitudinally slidable in such a way that in one end position of the shaft 7 only the bevel wheels 6 and 9 mesh with one another, and in the other end position of the shaft 7 only the bevel wheels 5 and 8 mesh with one another.

Upon the shaft 7 is mounted a toothed wheel 10, which meshes with a crown wheel 11 on the spring casing shaft 12 perpendicular to the shaft 7. The breadth of the toothed wheel 10 is so dimensioned that its engagement with the crown wheel 11 is maintained in any position of the shaft 7.

The shift bar 13 engages by means of a right angled projection 14 between two positioning rings 15 on the shaft 7, and is pivotally carried at the ends by arms 16 and 17 suspended in the machine frame. The arm 17 is extended downwards beyond the shift bar 13, and this extension 18 is in the form of a double wedge.

The double wedge 18 engages with the rotatable roller 19 (Figures 5 and 7) of a shift lever 20, which is rotatable about a pivot 21 supported parallel to the shift bar 13 and is held in its normal position under the action of a strong tension spring 22. Upon the pivot 21 is supported a safety lever which is subject to the action of a weaker tension spring 23, and which bears with one frame-shaped end 24 against a beak 26 on the shift lever 20, and with its other end 25 can be brought into engagement with two sharp-pointed grooves 27 and 28 in a positioning ring 29 mounted on the shaft 7.

For each of the ribbon spools 1 and 2 is provided a shift lever 30, by means of which the shift bar 13 is displaced. Each shift lever 30 (Figure 4) is bent out of sheet metal, is subject to the action of a spring 33, and carries on its vertical upper end 30ᵃ a roller 31 for the guiding of the ribbon 32. Underneath the cover plate 34 the shift lever 30 is bent at right angles into the horizontal direction. This horizontal portion 30ᵇ lies underneath the cover plate 34 and passes over into a short vertically bent portion 30ᶜ, to which is adjacent a bow-shaped portion, with the two horizontal limbs 30ᵈ and the vertical bridge piece 30ᵉ. The two horizontal limbs 30ᵈ are rotatable about a vertical pivot 35 and the lower limb 30ᵈ (Figure 7) engages with a projection 17ᵃ on the suspension arms 17 of the shift bar 13. The free end 30ᶠ of the lower limb 30ᵈ is beak-shaped and cooperates with one limb 37 of a locking bow 36, which is rotatable about a horizontal pivot 38 supported perpendicularly to the shift bar 13, the other limb 39 of which engages with the carrying arm 16 or 17 of the shift bar 13.

All the parts of the ribbon shifting means are supported in a U-shaped bow with horizontal bridge piece 40 and vertical limbs 41 and in two bows with vertical bridge pieces 42 and horizontal limbs 43. The bow with the horizontal bridge piece 40 is carried with its vertical limbs 41 by the vertical bridge piece 42 of the other two bows, the upper horizontal limbs 43 of which are secured underneath the cover plates 34. The mounting and dis-mounting of the entire ribbon shifting means is thus extremely simple.

The action of the ribbon shifting means described is as follows:—

In the position of the ribbon shifting means corresponding to Fig. 1, the left-hand bevel wheel 8 of the shaft 7 driven from the spring housing shaft 12 by means of the wheels 10 and 11 meshes with the bevel wheel 5 of the left-hand ribbon spool 1. The left-hand ribbon spool 1 is therefore set in constant rotation, while between the right-hand bevel wheel 9 of the shaft 7 and the bevel wheel 6 of the right-hand ribbon spool 2 there is no engagement, so that the latter can rotate freely with its pivot 35. The shifting of the ribbon thus takes place from right to left, that is to say the right-hand ribbon spool is unwinding and the left-hand ribbon spool winding up.

When the right-hand ribbon spool 2 is unwound the ribbon exerts upon the roller 31 of the right-hand shift lever 30 a pull towards the left-hand ribbon spool. By this means the shift lever 30 is rocked in this direction and its lower limb 30ᵈ places itself against the projection 17ᵃ on the right-hand carrying arm 17 of the switch bar 13 and slides the latter towards the left. During this displacement the left-hand wedge surface 18 of the right-hand carrying arm 17 presses the shift lever 20 downwards until the right-hand wedge surface of this carrying arm 17 comes into engagement with the roller 19 of the shift lever 20. The shift fork 20 under the action of its strong tension spring 22 is now moved upwards and the shift bar 13 is thereby shifted further towards the left with great acceleration. During this accelerated movement the projection 14 on the shift bar 13 places itself against the positioning ring 15 on the shaft 7 and brings the toothed wheel 8 of the latter out of engagement with the toothed wheel of the left-hand ribbon spool 1 but brings the toothed wheel 9 into engagement with the toothed wheel 6 of the right-hand ribbon spool 2. The shifting of the drive is thus effected during this quick displacement of the shift bar 13, that is to say very suddenly (Fig. 2).

As soon as the movement of the shift bar 13 is terminated or as soon as its movement is taken over by the wedge surface 18 of the carrying arm 17 the right-hand shift lever 30 returns to its original position. In this position the right-hand shift lever 30 remains locked as the limb 39 of the right-hand locking bow 36 is no longer in contact with the right-hand carrying arm. The right-hand locking bow 36 returns under the action of its own weight into its normal position and its limb 37 places itself against the beak 30ᶠ of the right-hand shift bow 30 so that the latter is locked.

During the displacement of the shift bar 13 its left-hand carrying arm has placed itself against the limb 39 of the left-hand locking bow 36 and raised its limbs 37. The left-hand shift bow 30 is thus not locked and can be oscillated by the ribbon when the left-hand ribbon spool 1 has run down. The shifting is then effected in the same manner as before.

By the second constructional form of the ribbon shifting means according to Figs. 8 to 11, which is only distinguished from the first constructional form as regards the special construction of the two-limbed locking bow, provision is made for ensuring the method of working of the locking bow even when the pull of the ribbon is strong, and the locking bow can be reliably moved by the carrying arm. This is effected by a division of the locking bow into two, its two limbs being rotatable independently of one another, but being connected with one another by a spring.

The two limbs 37 and 39 of the locking bow 36 do not consist of a single piece but are rotatable independently of one another about the pivot 38, being however connected with one another by a plate spring 45.

In the position of the right-hand carrying arm 17 of the shift bar 13 corresponding to Fig. 1, the pull of the ribbon takes place from right to left, that is to say the left-hand ribbon spool is being wound up and the right-hand ribbon spool unwound. When the right-hand ribbon spool is unwound, the reversal of the ribbon drive is effected that is to say the carrying arm 17 is rotated by the shift lever 30 in the direction of the arrow $a$ and no longer checks the downward movement of the locking bow limb 39. The two locking bow limbs 37 and 39 return to their normal positions under the action of their own weight and the locking bow limb 37 places itself against the beak $30^d$ of the switch lever 30, thus locking the latter.

After the termination of the shifting, the driving of the ribbon takes place from left to right, that is to say the left-hand ribbon spool unwinds and the right-hand one winds up. The shift lever not shown of the left-hand ribbon spool rotates the left-hand carrying arm and by means of the shift bar or connecting bar rotates the right-hand carrying arm 17 also in a direction opposite to the direction of the arrow $a$. The right-hand carrying arm 17 under these circumstances places itself against the locking bow limb 39 and rotates it in a clockwise direction.

If the pressure between the beak $30^d$ of the shift lever 30 and the locking bow limb 37, in consequence of the pull of the ribbon, is very strong, the limb 37 would hinder the rotation of the limb 39 if the two consisted of one piece. Since however the two limbs are supported independently of one another upon the pivot 38 and are only connected with one another by the spring 45 the limb 39 can rotate even when the limb 37 is locked by the beak $30^d$ of the shift lever 30, only the spring 45 bends upwards. When the shifting of the ribbon is finished the pressure between the limb 37 and the beak $30^d$ ceases, so the spring 45 can straighten itself and raise the limb 37 that is to say bring it out of engagement with the beak $30^d$ (Fig. 8).

The shift lever 30 is no longer locked.

The same processes of movement of course occur on the left-hand side of the ribbon shifting means alternately with those of the right-hand side.

In the case of the automatic ribbon shifting means hitherto described which is driven by the pull of the carriage or by a spring mechanism, it may however happen that the mechanism of the shifting device itself becomes jammed owing to the strong pull of the ribbon or fails from some other cause so that the spring housing and the carriage no longer move, but remain stationary. In the event of stoppage of the carriage the typist instinctively takes hold of the carriage releasing lever and pushes the carriage backwards and forwards in order to test the freedom of movement of the carriage without noticing that the cause of the trouble is to be sought in the jamming of the automatic ribbon shifting means. During the moving of the carriage the cord that pulls the carriage along drops off the spring housing and catches in the driving mechanism. The carriage cord then has to be replaced upon the spring housing and this may involve dis-mounting the carriage and in many cases removing other parts of the machine and often even replacing the damaged cord by a new one.

This inconvenience is eliminated according to the present invention by interposing between the carriage cord and the automatic ribbon shifting means a clutch which automatically slips when the resistance in the ribbon shifting means becomes greater than the pull of the carriage. The clutch therefore opens in the event of jamming of the automatic ribbon shifting means and the cord can no longer drop off during the moving of the released carriage.

The ribbon spool 2 (Fig. 12) is mounted upon a vertical pivot 4 which engages by means of a bevel wheel 6 with the bevel wheel 9 of a horizontal shaft 7. The shaft 7 is driven by bevel gearing by a shaft 12 in the same plane but in a direction perpendicular to itself, a toothed wheel 47 being mounted upon the shaft 12. The driving of the toothed wheel 47 is effected through the medium of a clutch from the spring housing 48 round which the cord of the carriage is passed.

The clutch consists of two clutch members 50 and 51 which comprise teeth upon the faces adjacent to one another and engage one another by means of these teeth. The two clutch members 50 and 51 are mounted upon a bushing 49 rigidly connected with the spring housing 48 and carried by a journal pivot 52 in such a way that the clutch member 50 can rotate about the bushing 49 and can not slide thereon while the other clutch member 51 is slidably and rotatably arranged thereon. The slidable and rotatable clutch member 51 meshes with the toothed wheel 47 and is subject to the action of a helical spring 53 which is interposed between the head of a screw 54 axially inserted into the journal pivot 52 and a disc 55 slidably mounted upon the screw and bearing against the outer face of the clutch member 51. The stress in the spring is so dimensioned that it is compressed at a definite resistance in the clutch.

The method of working of the apparatus described is as follows:—

On the spring housing 48 is pivoted a pawl (not shown) which during the rotation of the spring housing due to the pull of the carriage turns the clutch member 50 which in turn carries round with it the clutch member 51 owing to the interengaging teeth on the two clutch members. The clutch member 51 drives the toothed wheel 47 and with it the shaft 12, the bevel gearing and the shaft 7 which rotates the shaft 4 of the ink ribbon spool 2 (Fig. 12). Simultaneously with the rearward movement of the carriage the ribbon will thus also be shifted. If the carriage is pushed back by hand, then the pawl mounted on the spring housing slides over the teeth of the coupling member 50 which cannot rotate since the coupling member 51 is held stationary and prevented from rotating by means of a detent (not shown) secured on the typewriter frame. By this means, displacement of the ink ribbon during the rearward movement of the carriage is prevented. It may happen, however, that the automatic ribbon shift mechanism has become jammed, that is to say the ribbon spools remain stationary during writing, so that the toothed wheel 47 is unable to rotate. In this case, the ratchet teeth of the coupling member 50 ride up the teeth of the coupling member 51, forcing them aside against the action of the spring 53. The coupling member 51 is thus displaced in the direction of the arrow $a$ by an amount equal to the depth of the teeth and under the force of the spring 53 snaps back again into engagement after each displacement. The coupling member 50 thus slips so that the spring housing 48 can rotate in spite of the ribbon spools remaining stationary.

What I claim is:—

1. Ribbon reversing means for typewriters, comprising a horizontally displaceable shift bar for reversing the direction of drive of the ribbon, carrying arms from which said shift bar is freely suspended, reversing levers adapted to be acted upon by the ends of the ribbon and to act upon said carrying arms, and locking bows adapted to lock said reversing levers upon their return to normal position after acting upon the carrying arms.

2. Ribbon reversing means for typewriters, comprising a horizontally displaceable driving shaft for actuating the ribbon, transmission means for enabling said driving shaft to drive the ribbon in one direction when in one position and in the opposite direction when in another position, a horizontally displaceable shift bar coupled to said driving shaft and adapted to shift said driving shaft from one position to another to reverse the direction of drive of the ribbon, carrying arms from which said shift bar is freely suspended, reversing levers adapted to be acted upon by the ends of the ribbon and to act upon said carrying arms, locking bows adapted to lock said reversing levers upon their return to normal position after acting upon the carrying arms, a shift lever, a strong spring acting upon said shift lever and a double wedge shaped projection on one of the carrying arms adapted to engage with said shift lever in such a way that the shifting movement of the driving shaft coupled to the shift bar occurs suddenly under the action of the spring.

3. Ribbon reversing means for typewriters, comprising a horizontally displaceable driving shaft for actuating the ribbon, a horizontally displaceable shift bar coupled to said driving shaft and adapted to shift said driving shaft from one position to another to reverse the direction of drive of the ribbon, carrying arms from which said shift bar is freely suspended, reversing levers adapted to be acted upon by the ends of the ribbon and to act upon said carrying arms, locking bows adapted to lock said reversing levers upon their return to normal position after acting upon the carrying arms, a positioning ring on the driving shaft, said positioning ring being formed with two sharply pierced grooves therein, a shift lever, a safety lever coupled to said shift lever, said safety lever being adapted after each shift to enter one of the grooves in the positioning ring when the driving shaft is in one end position and the other of said grooves when the driving shaft is in its other end position to secure the driving shaft against displacement.

4. Ribbon reversing means for typewriters, comprising a horizontally displaceable shift bar for reversing the direction of drive of the ribbon, carrying arms from which said shift bar is freely suspended, reversing levers adapted to be acted upon by the ends of the ribbon and to act upon said carrying arms, a beak on each of said reversing levers, locking bows adapted to lock said reversing levers upon their return to normal position after acting upon the carrying arms, each of said locking bows comprising two limbs, and being adapted to bear with one limb against the associated carrying arm of the shift bar and with the other limb against the beak of the associated reversing lever, so that the engagement between the locking bow and the carrying arm releases the engagement between the locking bow and the reversing lever, and conversely.

5. Ribbon reversing means for typewriters, comprising a horizontally displaceable driving shaft for actuating the ribbon, transmission means for enabling said driving shaft to drive the ribbon in one direction when in one position and in the opposite direction when in another position, a horizontal displaceable shift bar coupled to said driving shaft and adapted to shift said driving shaft from one position to another to reverse the direction of drive of the ribbon, a wide spur wheel secured to the driving shaft, a spring housing shaft arranged perpendicularly to the driving shaft, a crown wheel secured to said spring housing shaft and adapted to mesh with the wide spur wheel and thereby to drive the driving shaft in all positions of the driving shaft, carrying arms from which said shift bar is freely suspended, reversing levers adapted to be acted upon by the ends of the ribbon and to act upon said carrying arms, and locking bows adapted to lock said reversing levers upon their return to normal position after acting upon the carrying arms.

6. Ribbon reversing means for typewriters, comprising a cover plate, two bows each comprising a vertical bridge piece and two horizontal limbs, the upper horizontal limb of each bow being secured to the under side of said cover plate, a third bow comprising a horizontal bridge piece and two vertical limbs, said vertical limbs being carried by the vertical bridge pieces of the other two bows, two carrying arms pivotally suspended from the bows, a horizontally displaceable shift bar for reversing the direction of drive of the ribbon, said shift bar being pivotally connected to the lower ends of said carrying arms, reversing levers adapted to be acted upon by the ends of the ribbon and to act upon said carrying arms, said reversing levers being pivoted to the horizontal limbs of the two first mentioned bows, and locking bows adapted to lock said reversing levers upon their return to normal position after acting upon the carrying arms, said locking bows being pivotally mounted upon the lower limbs of the two first mentioned bows.

7. Ribbon reversing means for typewriters, comprising a horizontally displaceable driving shaft for actuating the ribbon, transmission means for enabling said driving shaft to drive the ribbon in one direction when in one position and in the opposite direction when in another position, a horizontally displaceable shift bar, abutments on said driving shaft and said shift bar, said abutments being adapted to engage with one another to enable the shift bar to shift the driving shaft longitudinally to reverse the direction of drive of the ribbon, carrying arms from which said shift bar is freely suspended, reversing levers adapted to be acted upon by the ends of the ribbon and to act upon said carrying arms and locking bows adapted to lock said reversing levers upon their return to normal position after acting upon the carrying arms.

8. Ribbon reversing means for typewriters, comprising a horizontally displaceable driving shaft for actuating the ribbon, transmission means for enabling said driving shaft to drive the ribbon in one direction when in one position and in the opposite direction when in another position, a horizontally displaceable shift bar, abutments on said driving shaft and said shift bar, said abutments being adapted to engage with one another to enable the shift bar to shift the driving shaft longitudinally to reverse the direction of drive of the ribbon, at least one of said abutments being adjustable to facilitate mounting, carrying arms from which said shift bar is freely suspended, reversing levers adapted to be acted upon by the ends of the ribbon and to act upon said carrying arms and locking bows adapted to lock said reversing levers upon their return to normal position after acting upon the carrying arms.

9. Ribbon reversing means for typewriters, comprising a horizontally displaceable driving shaft for actuating the ribbon, two pairs of bevel wheels for enabling said driving shaft to drive the ribbon in one direction when in one position and in the opposite direction when in another position, a horizontally displaceable shift bar, a fixed abutment on said shift bar, two adjustable abutments on the driving shaft adapted to coact with the said fixed abutment, one of said adjustable abutments being secured to the driving shaft in such a position that it is contact with the left hand side of the fixed abutment when the shift bar is shifted towards the left while the right hand bevel wheels are in mesh and the other of said adjustable abutments being secured to the driving shaft in such a position that it is in contact with the right hand side of the fixed abutment when the shift bar is shifted towards the right with the left hand bevel wheels in mesh, carrying arms from which said shift bar is freely suspended reversing levers adapted to be acted upon by the ends of the ribbon and to act upon said carrying arms, and locking bows adapted to lock said reversing levers upon their return to normal position after acting upon the carrying arms.

10. Ribbon reversing means for typewriters, comprising a horizontally displaceable shift bar for reversing the direction of drive of the ribbon, carrying arms from which said shift bar is freely suspended, reversing levers adapted to be acted upon by the ends of the ribbon and to act upon said carrying arms, a locking beak on each of said reversing levers, locking bows adapted to lock said reversing levers upon their return to normal position after acting upon the carrying arms, each of said locking bows consisting of two limbs independently rotatable about the same axis, springs connecting the two limbs of each locking bow with one another, each of said locking bows engaging by one limb with one carrying arm of the shift bar and by the other limb with the locking beak of one of the reversing levers.

11. A drive for automatic ribbon reversing means for typewriters, comprising the combination with a carriage driving spring housing, a bushing fixed on said housing, two coupling members rotatably mounted on said bushing, one of said coupling members being adapted to turn with said spring housing and the other coupling member being in driving engagement with the ribbon reversing means, engaging means on said coupling members for operatively connecting said coupling members in driving relationship and a spring connected to said bushing and engaging said second mentioned coupling member for maintaining the said coupling members in driving relationship while enabling the second-mentioned coupling member to move out of driving relationship with said first-mentioned coupling member upon the ribbon reversing means jamming.

In testimony whereof I have signed my name to this specification.

CARL KUPFER.